(12) United States Patent
Chung et al.

(10) Patent No.: US 6,532,366 B1
(45) Date of Patent: Mar. 11, 2003

(54) TELEPHONE CALL OPTIMIZER

(75) Inventors: Jen-Yao Chung, Yorktown Heights, NY (US); Walter Charles Dietrich, Jr., Yorktown Heights, NY (US); German Sergio Goldszmidt, Dobbs Ferry, NY (US); Marc Hubert Willebeek-LeMair, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,034

(22) Filed: Jan. 29, 1999

(51) Int. Cl.[7] ................................................ H04Q 7/20
(52) U.S. Cl. ....................... 455/445; 455/405; 455/418; 455/512
(58) Field of Search ................................ 455/406, 407, 455/408, 422, 414, 415, 405, 445, 522; 379/111, 211, 112, 114.2, 229

(56) References Cited

U.S. PATENT DOCUMENTS

| | | | | | |
|---|---|---|---|---|---|
| 5,301,317 | A | * | 4/1994 | Lohman | 707/2 |
| 5,408,528 | A | * | 4/1995 | Chrlson | 379/211 |
| 5,671,403 | A | * | 9/1997 | Shekita | 707/3 |
| 5,715,304 | A | * | 2/1998 | Nishida | 379/114.02 |
| 5,915,214 | A | * | 6/1999 | Reece | 455/406 |
| 5,917,900 | A | * | 6/1999 | Allison | 379/229 |
| 5,978,455 | A | * | 11/1999 | Johnson | 379/111 |
| 6,169,791 | B1 | * | 1/2001 | Pokress | 379/114.02 |

* cited by examiner

*Primary Examiner*—Vivian Chin
*Assistant Examiner*—John J Lee
(74) *Attorney, Agent, or Firm*—McGuireWoods LLP; Stephen C. Kaufman, Esq.

(57) ABSTRACT

An interactive method that optimizes telephone usage for a call or set of calls, given the call criteria, and makes it easy for the consumer to use the carrier that achieves this minimum cost when the consumer is ready to make the call.

22 Claims, 5 Drawing Sheets

TELEPHONE CALL OPTIMIZER

BACKGROUND

The cost to the home or business consumer of telephone calls depends on many factors, including the telephone company chosen as the carrier. Because of deregulation, the consumer is able to choose, on a per-call basis, the carrier for each call. Each carrier has a known pricing structure (which can change over time) and quality of service. However, choosing a minimum cost carrier for a single call or for a set of calls is difficult because of the huge variety of rate plans available and the high number of parameters in each.

Traditional per call carrier rate plans generally take the following form: location, destination and time dependent fixed charge for the first n (a small integer) minutes (or part there of) plus a location, destination and a time dependent rate for the remaining minutes or part thereof. Recently, discount calling plans with "simplified" rates have become popular. Examples include per minute rate within a specific geography (e.g., 10 cents a minutes for calls within the US), per minute rate within a specific geography depending on start time of call (e.g. 5 cents a minute for weekend and evening calls within the US), special per minute rates for calls to a specific number, set of numbers, or specific country special per minute rate to the "number you call the most" each billing cycle, per minute rate plans that apply to calls within a specified geography lasting more than a certain amount of time (e.g. 20% off all calls over 20 minutes), calling cards or combination rate programs that prepay a fixed price for a specified number of minutes within a specified geography (e.g., 20 minutes US long distance free on a consumer's conventional phone with the purchase of a cellular phone contract, or, in another plan, 60 minutes of cell phone service per month for $25 with time beyond the first 60 minutes costing $1 per minute).

A typical consumer may subscribe to one long distance carrier and a specific rate plan offered by that carrier, but may access other carriers and other rate plans through the use of calling cards or by dialing a specific number before placing each call. The consumer may also subscribe to more than one long distance carrier by having multiple phone lines (and multiple phone numbers) or through some other technique.

Corporate customers often have a primary carrier with specific rates negotiated annually. These rates are likely to be quite cost effective for the bulk of the corporation's long distance calls but may not be the most inexpensive for certain calls, such as calls outside of normal business hours, calls of unusually long or short duration, or international calls. Thus corporate customers may also reduce total phone costs by careful selection of carrier on a call-by-call basis.

Various prior art systems require the cooperation of service providers or are not focused on end-users, and none teach or suggest the communication of one or more selections to a requester's wireless or mobile device. Thus, a need remains for a method that identifies an optimum phone number for each call or set of calls, given the call parameters, and makes it easy for a wireless (also called mobile) device user to interactively select and use the number when the consumer is ready to make the call. The present invention addresses such a need.

SUMMARY

The present invention is includes features for an interactive method that optimizes telephone usage for a call or set of calls, given the call criteria. In one example, a call optimizer makes it easy for a consumer to use a carrier that achieves this minimum cost when the consumer is ready to make the call.

An example of a method for optimizing telephone call usage includes the steps of: receiving a request from a mobile device to select one or more optimized numbers, the request including an un-optimized number and criteria upon which a selection is to be based; selecting the one or more optimized numbers based on the criteria, in response to the receiving step; and communicating a message to the mobile device, wherein the message includes the one or more optimized numbers selected.

Another example of a method for optimizing telephone call usage includes the steps of: receiving a request from a mobile device to select one or more phone numbers, the request including a pre-planned query and associated data upon which a selection is to be based; selecting the one or more phone numbers based on the query and the associated data, in response to the receiving step; and communicating a message to the mobile device, wherein the message includes the one or more phone numbers selected.

Yet another example of a method for optimizing telephone call usage includes the steps of: receiving a request from a remote device to select one or more optimized numbers, the request including an un-optimized number and criteria including a range of times for which the selection is to be based; selecting multiple optimized numbers based on the criteria and the range of times, in response to the receiving step; and interactively communicating the message to the remote device, a the message including the multiple optimized numbers selected and associated times within the range of times for each of the multiple optimized numbers.

DETAILED DESCRIPTION

Figure 1:
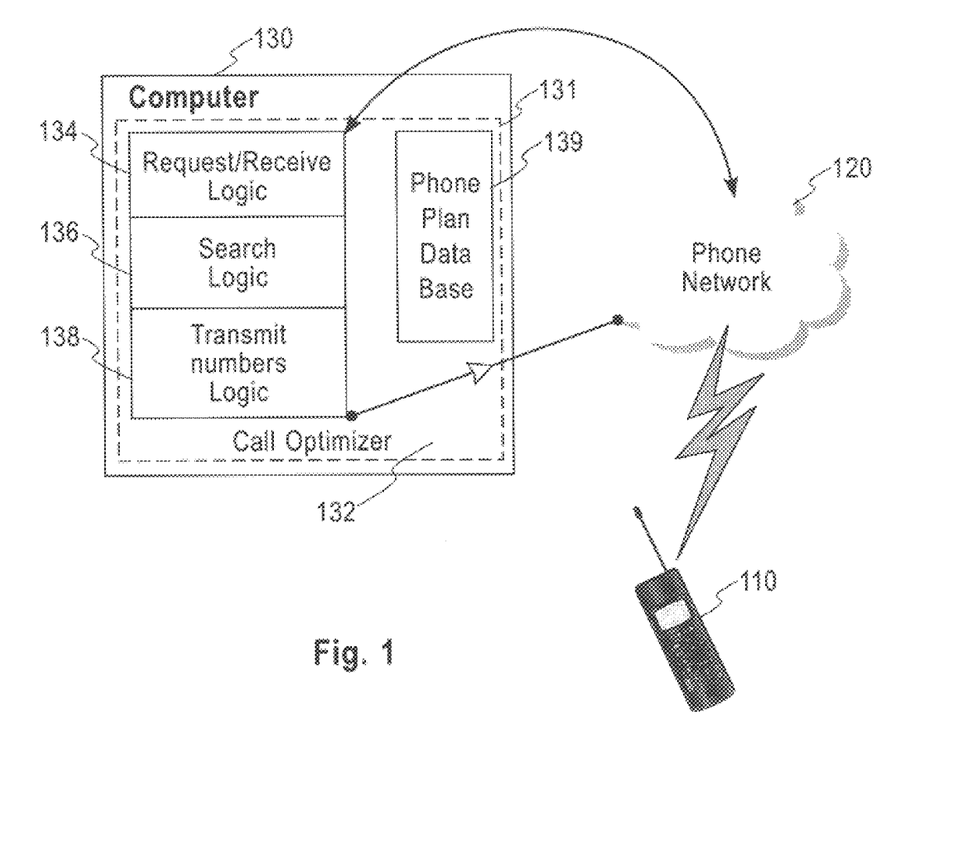
FIG. 1 depicts an example of a system having features of the present invention.

FIG. 1 depicts an example of a preferred embodiment of the system. As depicted the system includes a cell phone 110, a computer 130, and a telephone network 120. According to the present invention, the computer 130 includes in its memory 131 a "call optimizer" system 132, preferably embodied as computer software executable on the computer 130. The call optimizer system includes a phone plan Database 139, request/receive logic 134, search logic 136, and transmit numbers logic 138.

By way of overview, suppose that a person wants to call a phone number in another area code (or country) right now. Rather than dialing the number to be reached, the cell phone 110 is used to connect to the "call optimizer" in accordance with the present invention and transmits to it the desired phone number. Alternatively, a "hint", an ID, or indirect reference to the number can be sent. The call optimizer can use well known techniques to resolve the "hint", the ID, or the indirect reference and select the corresponding phone number.

Optionally, one can transmit additional information or criteria about the call, such as the expected length of the call (e.g., 10 to 20 minutes), time of day, geography (e.g., the home area), the desired quality of the connection (e.g., low, medium, high), a target time (or range of times) for the placement of the call, and/or other desired attributes (e.g., encryption, natural language translation, privacy, anonymity, etc.). The Request/Receive logic 134 of the call optimizer 132 receives the request and any accompanying information.

The database 139 stores the latest information about the current plans available from a variety of carriers, and may have a history of the use of these plans during the current billing or contract cycle. That is, the call optimizer 132 may know how many minutes, of a 20 minute prepaid program, have already been used. Using conventional search techniques, the Search logic 136 searches the Database 139 to find one or more optimal alternatives. The Transmit Numbers logic 138 uses conventional techniques to send the cell phone 110 (for example a PCS phone) a wireless message including the best phone number to use when placing the call. Existing cell phones (e.g., a Nokia model 2160) include the capability to initiate the call by simply pressing the SEND button (after the message has been received). Those skilled in the art will appreciate that the methods of the present invention could also readily be extended to work with a fax machine.

Many features can be added to the basic call optimizer:

1. The database 139 may also include available information about calls that will be made in the future;
2. The call optimizer could provide several alternatives. For example, use one number for a short call, and another one for a longer call. If a range of times that the call can be made is provided, the call optimizer can provide optimizations over the specified time range. In this case a "handshake" protocol could be used to accept either the default e.g., current option for immediate connection or a later (but more cost effective and/or convenient) option. The system could also include an option to send a reminder (page or e-mail) to the requester if one of the later options is selected. The reminder could also include the optimized number so that the requester can connect at that time. and
3. The call optimizer could be combined with a conventional phone switch so that a call could be made by using two phone lines (described in more detail with reference to FIG. 5).
4. The call optimizer could include an "address book" of frequently called numbers which the call optimizer updates with lowest line access information. This can reduce delays that might otherwise be incurred.

An implementation of the "call optimizer" is first described as a sequence of steps that can be implemented as either a computer program to run on a general purpose computer or as specialized hardware. Then, using the "call optimizer" as an entity, various implementations of call cost optimization are described. These implementations differ in one or more of the following aspects: different means for entering information about the call being placed; using different means for transmitting this information to the call optimizer; different means for transmitting carrier information back to the user; and different means for actually placing the call.

In each of these implementations, the information is provided about the rate plans and carriers available. This information can be provided using conventional techniques such as manual entry by the user and/or administrator. The information can also be "downloaded" from another computer, for example by using a network such as the Internet. In fact, a telephone company, third-party, software vendor or hardware vendor may provide a service that provides this information for a fee or for free (with the goal, perhaps, of making their telephone service, software, or hardware more attractive for users of this invention).

To simplify the description of the invention, the description is written as if each carrier had one rate plan. Carriers may, of course, have more than one rate plan. This invention is able to recognize and process multiple rate plans per carrier. To understand this, consider each rate plan offered by a given carrier, together with a carrier, to be a "virtual carrier". For a carrier that only has one rate plan, the carrier and the "virtual carrier" are the same thing.

Figure 2:
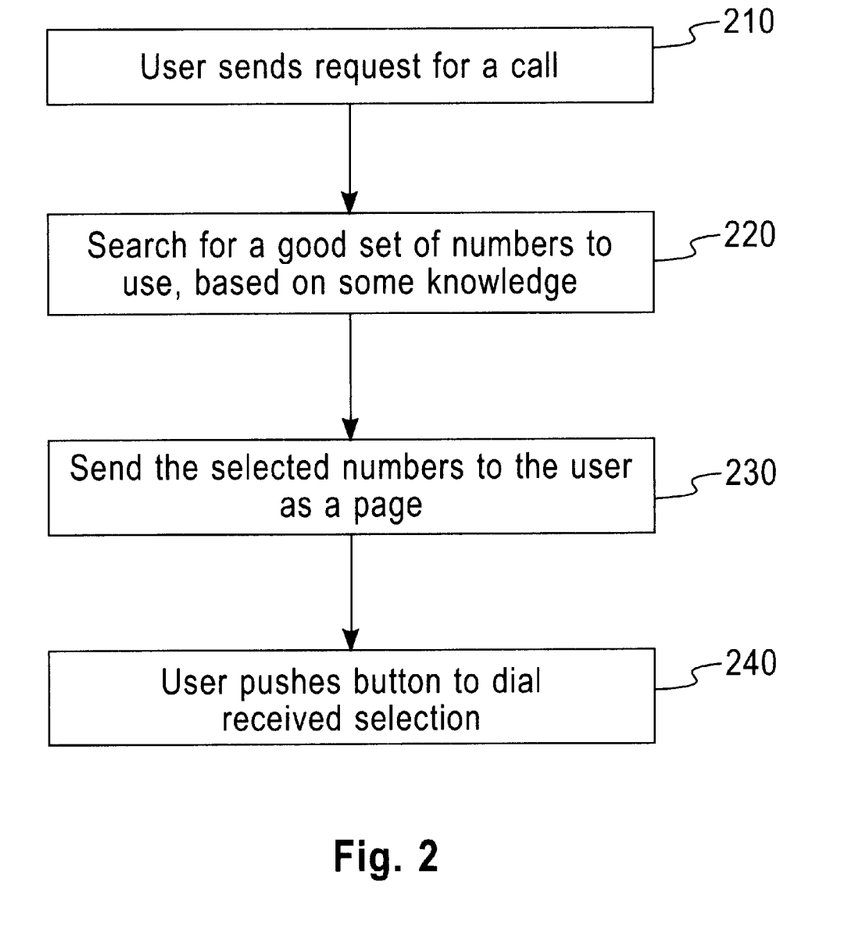
FIG. 2 depicts an example of a process having features of the present invention.

FIG. 2 depicts an example of a process having features of the present invention. In step 210, the user of the cell phone sends a message to the computer, requesting the dialing prefix number of the best plan to make a long distance phone call to a given number.

In step 220, the computer receives the request, and then searches for an appropriate phone plan in its Database 139. For example, for each of two or more virtual carriers, the search logic 136 and database 139 are used to determine the cost of placing the call through that virtual carrier and select an optimum virtual carrier for the call.

In step 230, the computer uses the transmit numbers logic to send to the user a message, e.g., an e-mail or a "page" including the corresponding dialing prefix numbers of the best plans found to call the given number based on the criteria. The message can be sent using a variety of techniques. These techniques include sending a page including the sequence of numbers being sent to the phone 270. The sequence of numbers represent the phone number that must be dialed to use the chosen virtual carrier and calling plan. For example, this transmitted message may combine a set of prefixes, with the actual long distance number to be called, thereby facilitating the user dialing task. The means for sending the page include: using a network such as an intranet or the Internet 272 to send e-mail to a site that will cause a page to be sent, or to access a web page where data entry can be emulated to cause the page to be sent; send an instant message that will cause a page to be sent; and use a modem to call the phone network 275 to call another phone number where a sequence of touch tone phones can be entered to cause a page to be sent. For example, one can send Internet e-mail (containing the selected optimized number(s)) to a AT&T Digital PCS phone, AT&T alphanumeric pager or AT&T POCKENET® service. One can address the message using the recipient's AT&T Digital PCS phone number, 10-digit pager number or AT&T Nationwide PIN and add @mobile.att.net to the end (see e.g., http://www.mobile.att.net/mc/email.html). Alternatively, there are web-based forms (e.g., in conjunction with conventional CGI programs) that can be used to send a page (see e.g., http://www.mobile.att.net/mc/mc start.cgi).

In step 240, the user receives the message. When ready to initiate the call, in the case of a wireless device such as a cell phone, the user pushes the "send" button to dial the optimized number. Computers, and some Internet appliances and wireless and mobile devices include multi-line display capability. Here, the call optimizer could send several, possibly prioritized, numbers based on the criteria requested by the user. If a number of options are provided, some of which are at later times, the user could "accept" one of these and the call optimizer could send a page or e-mail reminder to the user at or before the designated time. Alternatively, the user could enter the number manually, if necessary, and then "send". One skilled in the art will appreciate that a smart phone or speech-enabled computer or Internet appliance could be enhanced with logic to automatically dial the optimized number (without requiring the pushing of a button); select a number from a list; iterate through the list of numbers; or automatically complete the call at a later time if this was one of the optimizations provided.

In an alternative embodiment, the number to be selected and criteria can be the result of a pre-planned query and data associated with the query to select the desired number. For example, the database could include an itinerary of scheduled calls for a requester. According to the present invention, the requester sends to the call optimizer a pre-planned query, i.e., one known to the call optimizer, and associated data necessary to calculate the query. Here, the call optimizer selects the next call form the requesters itinerary and sends the number to the mobile device of the requester. In another example, the call optimizer can be used to locate and call people at their preferred number. The call optimizer includes an interface to a system "X" that maintains the preferred phone numbers of parties that might be called. (The data in the X system could be updated by the other parties, by secretaries, or possibly by automatic means such as sensors in cell phones or environments that the other parties frequent.) When the requester wants to call another party, the requester sends a pre-planned query containing the name (or ID) of the other party. The call optimizer uses the "X" system to find the other party's current preferred phone number. The call optimizer then sends the preferred phone number to the mobile device of the requester.

Figure 3:
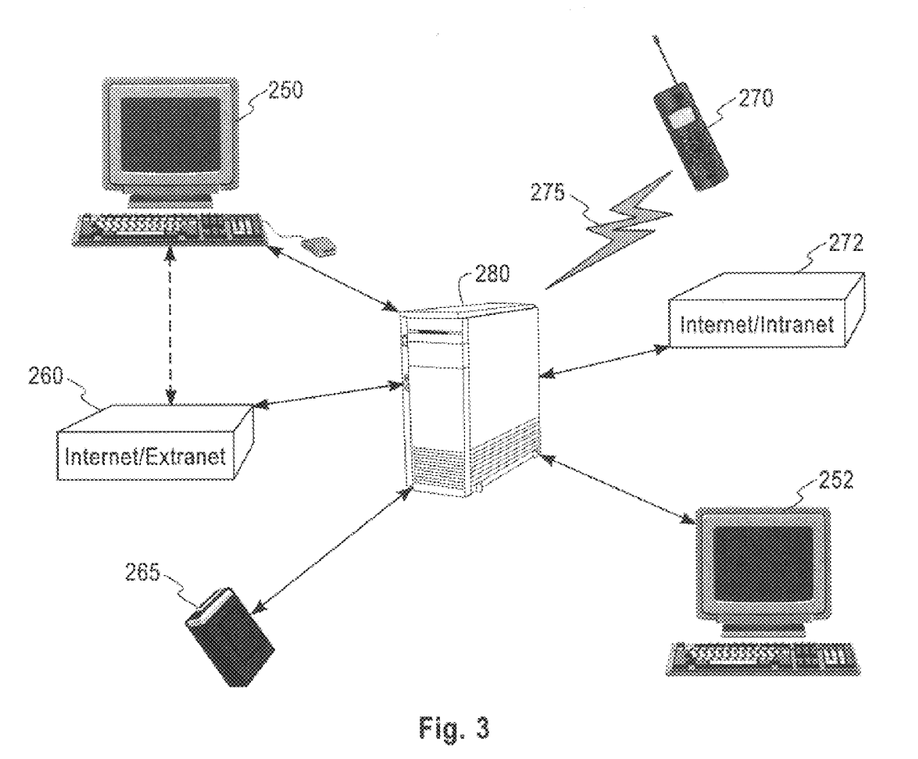
FIG. 3 depicts another example of a system having features of the present invention.

FIG. 3 depicts another example of a system having features of the present invention. As depicted, a user can transmit, using any of a variety of conventional communication techniques, information about the call to be made to the PC/Server/workstation/PBX 280. The information is received by the Request/Receive Logic (FIG. 1, 134) of the call optimizer (FIG. 1, 132) running on the PC 280. These techniques include but are not limited to well-known voice response unit (VRU) technology, and speech recognition technology. The information preferably includes one or more of the following data: a number to be called; quality of service; expected call duration (or range of duration); and start time (or range of start times) of the call; and possibly target pricing. These hardware/software interfaces with the call optimizer include: locally attached User Interface devices 250 (for example, screen, keyboard, and/or mouse); a locally attached terminal 252 (for example, a "dumb terminal' including a screen and keyboard); and other mobile devices 270 (wireless devices, cellular phone, smart phone, Internet appliance, etc.).

The devices and the call optimizer can intercommunicate using one or more of: the telephone network 275; Internet and/or intranet 272; or extranet interface 260 to the call optimizer. For example, one skilled in the art will appreciate that information could be transmitted using well known techniques including but not limited to: a web browser; e-mail; or instant messaging; two-way pager 265; other text-based communication means that transmits information between the requesting device and the call optimizer; or other communication technologies. If the device/number that will originate the call can not be deduced automatically (using caller-ID, for example), that information must also be provided.

Figure 4:
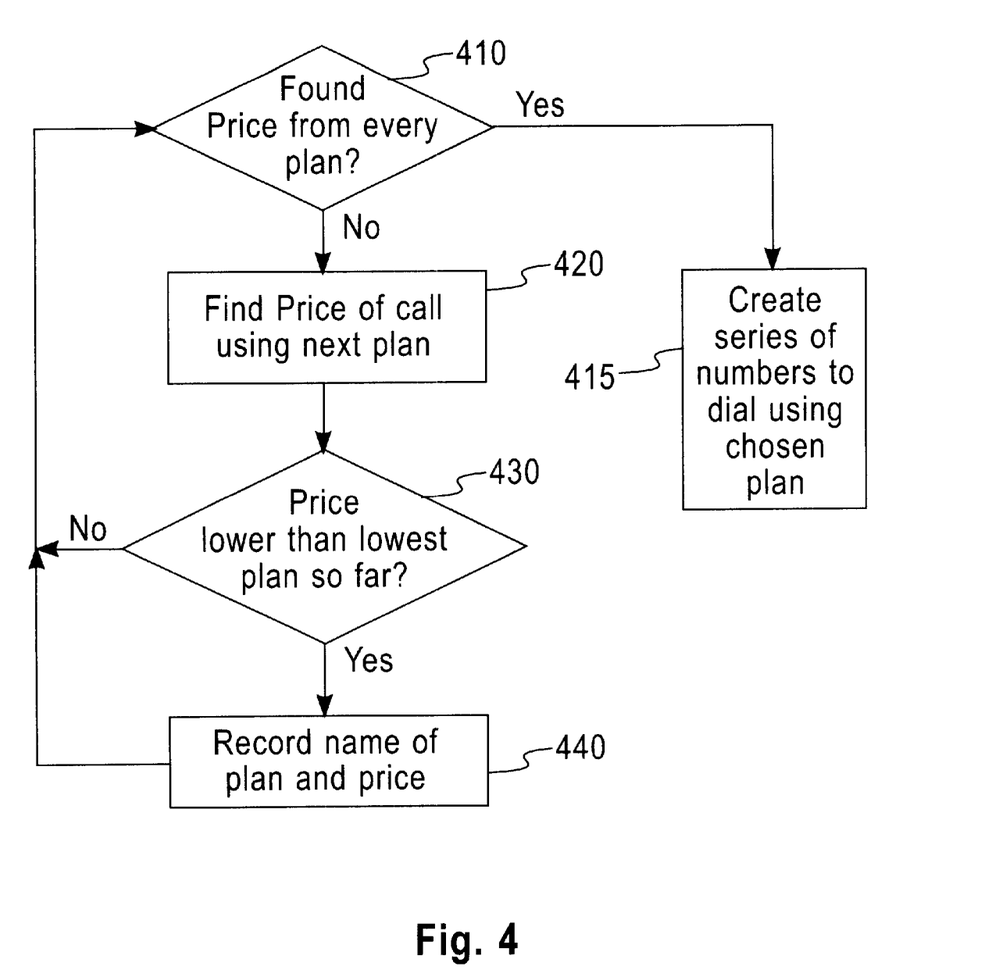
FIG. 4 depicts an example of the search logic of FIG. 2.

FIG. 4 depicts an example of the search logic 136 that the computer uses to find an ordered set or series of numbers which are dial prefixes for the lowest priced plan. As depicted, in step 410, the computer search logic 136 checks if it has found all the prices corresponding to every plan. If so, in step 415, it creates a series of numbers that can be dialed to access the chosen calling plan. If not, in step 420, the computer searches for the price of the call using the next available plan from the Database 139. In step 430, the computer compares the price of this plan to the best price found so far. If it is lower, then is step 440 the computer records the name of the plan and price. If it is not lower, then the computer returns to the test of step 410. In the case where ranges of criteria are provided or multiple optimizations are requested, an ordered list of optimizations can be stored and provided to the Transmit numbers logic 138.

Figure 5:
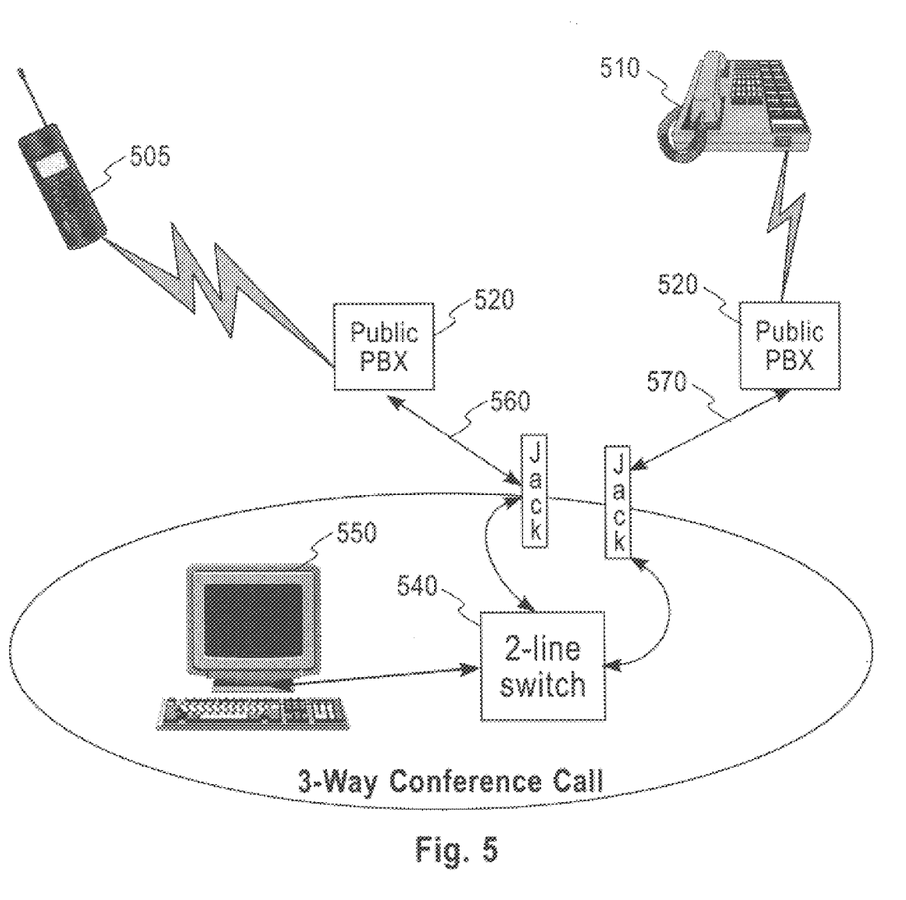
FIG. 5 depicts yet another example of a system having features of the present invention.

FIG. 5 depicts an example of a system architecture using two separate phone lines and a switch that can connect them. In this implementation, the basic implementation is combined with a simple phone switch (see e.g., U.S. Pat. No. 5,719,925) so that a call could be made by using two phone lines 560, 570. This feature would be similar to a conference call between the party initiating the call 505, the party receiving the call 510 and a third party. In this case, the third party would be at the location of the phone switch 540 and would not participate in the "discussion". The switch 540 would "connect" the two lines 560, 570 so that the calling party and other party could converse or communicate as if they were using a regular phone connection. Information about the party to be called could be provided using any of the means described in Step 210. A particularly attractive implementation would use voice recognition or VRU technology for step 210. The user of the cell phone would disconnect. The computer would perform step 220 and use the switch 540 to dial the phone number using the chosen virtual carrier and jack 535 and phone line 570 and use the switch to dial the cell phone 505 using the second jack 530 and second phone line 560 and then connect the two phone lines using the switch.

This implementation could be changed to use more than two phone lines by using a more sophisticated switch (or a PBX 520) in order to support multiple users (perhaps in an office) or to allow for more flexibility (particularly if there are (ordinary) phones that can use the same phone lines).

A Service Implementation

This implementation is similar to the basic implementation for home customers using software running on a PC, but the PC 280 is operated by a service that allows many users to find the best virtual carrier for a call. In addition to the information used in the basic implementation above, information about each user could be saved and used. This information could include data about the calling plans and carriers that the user subscribes to and data about preferred means of communicating with the user (such as e-mail address, pager number, PCS cell phone number, and other phone numbers).

Certain means of communicating with the PC 280 in the basic implementation may not be used in this implementation. For example, locally attached User Interface devices and phones that can be connected directly to the PC would probably not be used. On the other had, a conventional network computer that communicates with the PC could have a phone connected directly to it (or integrated with the network computer), allowing the numbers to be dialed automatically.

In addition, the PC used in the basic implementation could be replaced by a more powerful computer, such as a server, or a special purposed device that performs the "call optimizer" function and the functions that interface with the users and their devices.

In this implementation, the organization providing the service could be remunerated by charging a per-call fee, charging a subscription charge, or requiring the caller to listen to a commercial, perhaps while the computer is computing the low-cost provider. Other remuneration means are, of course, possible, or the service could be provided "in-house" to members of the same organization so that the members would not have to have their own computers running the basic implementation described above.

A preferred embodiment of the present invention includes features implemented as software tangibly embodied on a computer program product or program storage device for execution on a processor (not shown) provided with computer 130, or server 280. For example, software implemented in a popular object-oriented computer executable code such as JAVA provides portability across different platforms. Those skilled in the art will appreciate that other procedure-oriented and object-oriented (OO) programming environments can also be employed.

Those skilled in the art will also appreciate that methods of the present invention may be implemented as software for execution on the computer or other processor-based device. The software may be embodied on a magnetic, electrical, optical, or other persistent program and/or data storage device, including but not limited to: magnetic disks, DASD, bubble memory; tape; optical disks such as CD-ROMs; and other persistent (also called nonvolatile) storage devices such as core, ROM, PROM, flash memory, or battery backed RAM. Those skilled in the art will appreciate that within the spirit and scope of the present invention, one or more of the components instantiated in the memory of the computer 130 or server 280 could be accessed and maintained directly via disk (not shown), the network 260, 272, another server, or could be distributed across a plurality of servers.

Now that the invention has been described by way of a preferred embodiment, with alternatives, various equivalents and modifications will be readily apparent to those skilled in the art and the generic principles herein may be applied to other embodiments. Thus, the present invention is not intended to be limited to the embodiment shown but is to be accorded the widest scope consistent with the appended claims consistent with the principles and features described herein.

We claim:

1. A method for optimizing telephone call usage, comprising the steps of:
    receiving a request from a mobile device to select one or more optimized numbers, the request including an un-optimized number and criteria upon which a selection is to be based;
    selecting the one or more optimized numbers based on the criteria, in response to said receiving step;
    communicating a message to the mobile device, wherein the message includes the one or more optimized numbers selected; and
    dialing said mobile device with said un-optimized number using one of said one or more optimized numbers as a dialing prefix.

2. The method of claim 1, wherein the mobile device is a wireless phone, further comprising the steps of:
    said communicating step comprising sending a page to the wireless phone, the page providing multiple optimum numbers based on the criteria.

3. The method of claim 2, wherein said communicating step utilizes means selected from the group consisting of: a modem; using the Internet to send e-mail to a site that will cause a page to be sent; accessing a web page where data entry can be emulated to cause the page to be sent; sending an instant message that will cause a page to be sent; and using a phone network to call another phone number where a sequence of touch tone phones can be entered to cause a page to be sent.

4. The method of claim 1, further comprising the steps of:
    said receiving step comprising receiving criteria including a range of times for which the selection is to be based;
    said selecting step comprising the step of selecting multiple optimized numbers based on the criteria and the range of times, in response to said receiving step; and
    said communicating step comprising the step of interactively communicating the message to the mobile device, wherein the message includes the multiple optimized numbers selected and associated times within the range of times for each of the multiple optimized numbers.

5. The method of claim 4, further comprising the steps of:
    receiving from the mobile device a selected number from the multiple optimized numbers having an associated time, in response to said interactively communicating step; and
    communicating a message including the selected number to the mobile device at the associated time.

6. The method of claim 4, further comprising the steps of:
    receiving from the mobile device a selected number from the multiple optimized numbers having an associated time, in response to said interactively communicating step;
    scheduling the selected number for placement at the associated time; and
    connecting the mobile device to the selected number at the associated time.

7. The method of claim 1, further comprising the steps of:
    storing in a database, frequently called numbers for a requester;
    periodically updating the frequently called numbers to provide and store associated optimized numbers for the frequently called numbers;
    receiving a request to optimize a frequently called number;
    retrieving an associated optimized number for the frequently called number; and
    communicating the associated optimized number to the mobile device.

8. The method of claim 1, said selecting step further comprising the steps of:
    selecting an ordered set or series of numbers which are dial prefixes for a lowest priced calling plan.

9. The method of claim 1, said selecting step further comprising the step of selecting a carrier providing a lowest cost service.

10. The method of claim 1, wherein the mobile device is selected from the group consisting of: a cell phone; hand held computer; or Internet appliance.

11. The method of claim 1, wherein the criteria is selected from the group consisting of: an expected length of the call; time of day, geography; a desired quality of connection; a target time for connection; or a range of times for connection.

12. The method of claim 1, further comprising the steps of:
    said communicating step comprising the step of dialing an optimized number using a first phone line;

dialing the mobile device using a second phone line; and
connecting the two phone lines using a switch.

13. A method for optimizing telephone call usage, comprising the steps of:

receiving a request from a mobile device to select one or more phone numbers, the request including a pre-planned query and associated data upon which a selection is to be based;

selecting the one or more phone numbers based on the query and the associated data, in response to said receiving step; and communicating a message to the mobile device, wherein the message includes the one or more phone numbers selected to be dialed on said mobile device as a prefix with a called number.

14. The method of claim 13, wherein the query is a request to select a phone number from an itinerary, said selecting step further comprising the step of selecting a next phone number from the itinerary; and said communicating step comprising the step of communicating the selected phone number to the mobile device.

15. The method of claim 13, wherein the query is a request to locate a phone number associated with a person to be called, said selecting step further comprising the step of locating the phone number; and said communicating step comprising the step of communicating the selected phone number to the mobile device.

16. A method for optimizing telephone call usage, comprising the steps of:

receiving a request from a remote device to select one or more optimized numbers, the request including an un-optimized number and criteria including a range of times for which the selection is to be based;

selecting multiple optimized numbers based on the criteria and the range of times, in response to said receiving step;

interactively communicating the message to the remote device, the message including the multiple optimized numbers selected and associated times within the range of times for each of the multiple optimized numbers; and dialing said un-optimized number on said remote device using one of said multiple optimized numbers as a prefix.

17. The method of claim 16, further comprising the steps of:

receiving from the remote device a selected number from the multiple optimized numbers having an associated time, in response to said interactively communicating step; and communicating a message including the selected number to the remote device at the associated time.

18. The method of claim 16, further comprising the steps of:

receiving from the remote device a selected number from the multiple optimized numbers having an associated time, in response to said interactively communicating step;

scheduling the selected number for placement at the associated time; and connecting the mobile device to the selected number at the associated time.

19. A program storage device readable by a machine, tangibly embodying a program of instructions executable by the machine to perform method steps for optimizing telephone call usage, said method steps comprising:

receiving a request from a mobile device to select one or more optimized numbers, the request including an un-optimized number and criteria upon which a selection is to be based;

selecting the one or more optimized numbers based on the criteria, in response to said receiving step;

communicating a message to the mobile device, wherein the message includes the one or more optimized numbers selected; and dialing said mobile device with said un-optimized number using one of said one or more optimized numbers as a dialing prefix.

20. A program storage device readable by a machine, tangibly embodying a program of instructions executable by the machine to perform method steps for optimizing telephone call usage, said method steps comprising:

receiving a request from a mobile device to select one or more phone numbers, the request including a pre-planned query and associated data upon which a selection is to be based; selecting the one or more phone numbers based on the query and the associated data, in response to said receiving step; and communicating a message to the mobile device, wherein the message includes the one or more phone numbers selected to be dialed on said mobile device as a prefix with a called number.

21. A program storage device readable by a machine, tangibly embodying a program of instructions executable by the machine to perform method steps for optimizing telephone call usage, said method steps comprising:

receiving a request from a remote device to select one or more optimized numbers, the request including an un-optimized number and criteria including a range of times for which the selection is to be based;

selecting multiple optimized numbers based on the criteria and the range of times, in response to said receiving step;

interactively communicating the message to the remote device, a the message including the multiple optimized numbers selected and associated times within the range of times for each of the multiple optimized numbers; and dialing said mobile device with said un-optimized number using one of said multiple optimized numbers as a dialing prefix.

22. A system for selecting an optimum rate for a telephone call, comprising:

a phone rate plan database storing a plurality of rate plan information for a plurality of carriers;

a receiver for receiving a called telephone number from a caller;

search logic for searching said phone rate plan database and obtaining optimum numbers for accessing at least one optimum rate plan stored in said phone rate plan database; and a transmitter for transmitting said optimum numbers to the caller, wherein when the caller dials one of said optimum numbers as a prefix with said called telephone number a resultant call is routed via said optimum rate plan.

* * * * *